United States Patent [19]

Silverstein

[11] Patent Number: 5,428,409
[45] Date of Patent: Jun. 27, 1995

[54] NIGHT DRIVING GLASSES

[76] Inventor: Fred Silverstein, 460 E. 79th St., New York, N.Y. 10021

[21] Appl. No.: 37,915

[22] Filed: Mar. 26, 1993

Related U.S. Application Data

[63] Continuation-in-part of Ser. No. 792,301, Nov. 14, 1991, abandoned.

[51] Int. Cl.$^6$ ............................................. G02C 7/16
[52] U.S. Cl. ....................................... 351/45; 351/44; 351/46
[58] Field of Search ................ 351/45, 44, 46, 165, 351/49; 359/722

[56] References Cited

U.S. PATENT DOCUMENTS

| | | |
|---|---|---|
| 1,180,341 | 4/1916 | Thomas . |
| 1,257,667 | 2/1918 | Barr . |
| 1,272,833 | 7/1918 | Metcalf . |
| 2,334,446 | 11/1943 | Serrell . |
| 3,254,932 | 6/1966 | Blaney . |
| 4,070,097 | 1/1978 | Gelber ..................... 359/722 |
| 4,470,673 | 9/1984 | Gilson et al. . |
| 4,542,964 | 9/1985 | Gilson et al. . |
| 4,859,047 | 8/1989 | Badewitz . |
| 4,915,495 | 4/1990 | Takeuchi . |
| 5,182,588 | 1/1993 | Maurer et al. ............ 351/165 |

FOREIGN PATENT DOCUMENTS

| | | |
|---|---|---|
| 282598 | 8/1965 | Australia . |
| 5362 | of 1907 | United Kingdom . |

OTHER PUBLICATIONS

*TWA Ambassador* magazine, May/Jun. 1991, p. 21.

*Primary Examiner*—William L. Sikes
*Assistant Examiner*—Hung Xuan Dang
*Attorney, Agent, or Firm*—Cooper & Dunham

[57] ABSTRACT

Night driving eyeglasses include an illuminating color band extending upwardly from the bottom of the lens to cover about 50 per cent to about 75 per cent of the surface area of the lens and a glare-reducing color band extending downwardly from the top of the lens to cover about 25 per cent to about 50 per cent of the surface area of the lens, with a distinct interface between the color bands. The glasses further include a nonreflective coating made from a plurality of layers of magnesium oxide selectively applied to a surface of the lenses of the glasses. Preferably, the distinct interface is located about 5 mm above the top of the wearer's pupil. The color bands and the nonreflective coating all cooperate to equalize the illumination of the wearer's entire field of vision.

19 Claims, 1 Drawing Sheet

NIGHT DRIVING GLASSES

This is a continuation-in-part of application Ser. No. 07/792,301, filed Nov. 14, 1991 now abandoned, the contents of which are hereby incorporated by reference.

BACKGROUND OF THE INVENTION

Field of the Invention

The present invention relates generally to night driving eyeglasses and, more particularly, to eyeglasses having the dual ability to brighten a driver's field of vision and protect the driver from the glare of headlights from oncoming traffic.

Description of the Background

Night driving is difficult for many people and poses traffic hazards. Objects and road signs normally visible in daylight are difficult to see at night, even on well-lit streets. Moreover, impaired night vision can adversely effect a driver's ability to judge distance. If one is unable to perceive the location of an object relative to its surroundings, then one may not realize that the object is closer than it appears. Closer distances require shorter reaction time and the risk of accident is increased. Not being able to see an object until driving closer to it might easily mean the difference between striking the object and avoiding it.

Glare from extraneous light sources create another hazard of night driving. The most common source of glare, light from the headlights of oncoming traffic, is temporarily blinding, and a driver may require several seconds to recover from the glare and readjust to the darkness. During this recovery time, the driver is not able to direct his or her attention to the road, increasing the risk of accident.

Illumination from streetlights create yet another night driving hazard. The light from streetlights is localized and illuminates only objects within its vicinity. This localized illumination makes the unlit surroundings appear even darker. When surroundings are invisible, a driver's frame of reference is removed, further impairing the driver's ability to see and to judge distance.

In view of all these hazards, it has become desirable to wear glasses to improve nighttime vision without increasing the glare of oncoming headlights. To this end, several eyeglass designs previously have been proposed.

There has been proposed night glasses having lenses tinted yellow (*TWA Ambassador* magazine, May/June 1991, p. 21). However, these glasses cannot reduce glare from oncoming headlights. In the same advertisement, there is disclosed daytime sunglasses having the upper portion of the lenses tinted brown and the lower portion of the lenses tinted yellow. However, the upper and lower tints of the daytime glasses blend at a position directly opposite the wearer's pupil. Therefore, under normal viewing, the wearer looks through a blend of colors, eliminating the benefits of the specially chosen tints.

U.S. Pat. No. 2,334,446 (Serrell) proposes eyeglasses wearable during the day or at night. A "nighttime" portion of the lens is polarized at an angle sufficient to reduce the glare of reflected nighttime light (column 1, line 55, through column 2, line 14). A "daytime" portion of the lens is polarized at an angle sufficient to reduce the glare of reflected daytime light (column 2, lines 15–23). These glasses are designed only to reduce glare, and are intended to be worn both during the day and at night. They do not enhance vision at night. See also U.S. Pat. No. 4,915,495 (Takeuchi) which proposes lenses having a polarizing coating on the upper portion to absorb ultraviolet and infrared light from a computer screen.

U.S. Pat. No. 3,254,932 (Blaney) proposes clip-on welding frames adapted to be removably affixed over a pair of glasses to protect welders from the glare of the welding arc. The lens elements of the welding frames are lightly tinted green throughout. Auxiliary lenses, tinted a darker green than the lens elements, are placed against the upper portion of the lens element (column 3, lines 6–21). During the welding operation, the welder looks up through the darker auxiliary lenses. When reading or performing other duties, the welder looks down through the lighter lower portions of the clip-on frames. Because these frames are designed to clip onto a pair of glasses, they cannot be used by those who do not wear glasses. Moreover, they are quite heavy due to the auxiliary lens attached to the main lenses. Further, the green tint does not effectively transmit and absorb the appropriate spectra of light for enhancing night vision and reducing glare.

U.S. Pat. No. 4,859,047 (Badewitz) proposes night driving glasses adapted to be used alone or affixed to prescription eyeglasses. The upper portion of the lenses are tinted to reduce glare. A narrow horizontal strip filter region extends along the bottom of the lenses (column 4, lines 26–30). The width of the narrow strip is calculated based on several predetermined variables, including the location of the driver with respect to the road and with respect to oncoming vehicles (column 4, lines 52–68). In order to use the glasses properly, the driver must tilt his or her head a predetermined angle, based on the predetermined width of the narrow strip. Because the strip filter region is narrow, the glasses are difficult to use because the driver is likely to tilt his or her head more or less than the required angle to properly look through the narrow filter strip.

U.S. Pat. Nos. 4,470,673 and 4,542,964 (Gilson et al.) propose eyeglasses for use with video display terminals to improve operator performance and reduce discomfort. The bottom portion of the lenses are clear or tinted to enhance the clarity of the display (U.S. Pat. No. 4,470,673, column 11, lines 14–29). The upper portion of the lenses are translucent to block vision in the upper field of view and eliminate glare from overhead lighting (U.S. Pat. No. 4,470,673, column 8, lines 37–45). Vision through the translucent portion of the lenses is substantially blocked to minimize visual distractions. Thus, use of these glasses while driving at night could be fatal.

None of the above proposals are capable of maximizing the ambient light and enhancing the clarity of objects on and near the road, as well as equalizing the intense, glaring light from the headlights of oncoming traffic.

SUMMARY OF THE INVENTION

The present invention overcomes the deficiencies of the above-proposed glasses by providing night driving glasses having lenses of a unitary structure with an illuminating color band and a glare-reducing color band, a distinct interface between the color bands, and a nonreflective coating applied to a surface of the lens.

The glare-reducing color band extends downwardly from the top of the lens to cover about 25 per cent to about 50 per cent of the surface area of the lens, and the illuminating color band extends upwardly from the bottom of the lens to cover the remainder of the surface area of the lens. Preferably, the glasses are specially fit to the wearer so that the distinct interface between color bands is located about 1 mm to about 8 mm above the top of the wearer's pupil, and, most preferably about 5 mm above the pupil.

The lenses are coated with a nonreflective material, such as magnesium oxide. The coating reduces glare and thereby increases the amount of ambient light transmitted through the lens without impeding visibility. The nonreflective coating, in combination with the illuminating and glare-reducing color bands, provide optimal illumination and glare reduction for night vision.

The illuminating color band has a transmissivity of about 40 to about 80 per cent, and preferably is yellow in color. The glare-reducing color band has a transmissivity of about 15 to about 35 per cent and preferably is gray in color. The nonreflective coating reduces glare to provide additional transmission of about 4 to about 7 per cent of the ambient light, and is transparent. The transmissivity of each of the color bands and the nonreflective coating is variable, so that a wearer can selectively vary the darkness of the color bands while maintaining a desired degree of glare reduction by adjusting the transmissivity of the nonreflective coating. Optimal transmissivity is about 75 per cent under normal night driving conditions, that is, when viewing through the illuminating color band.

The above and other objects, features, and advantages of the present invention will become apparent from the following detailed description of preferred embodiments when read in conjunction with the accompanying drawings, in which the same reference numerals are used to identify the same or similar parts in the several views.

BRIEF DESCRIPTION OF THE DRAWINGS

FIG. 2b is a cross-sectional view of a lens of night driving glasses showing the application of a plurality of layers of the nonreflective coating shown in FIG. 2a.

DETAILED DESCRIPTION OF PREFERRED EMBODIMENTS

Figure 1:
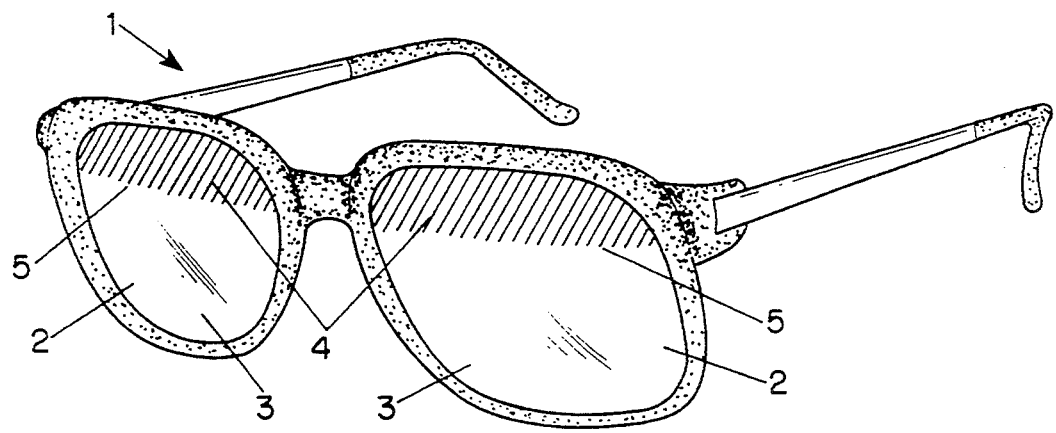
FIG. 1 is a perspective view of night driving glasses according to an embodiment of the present invention.

With reference to the drawings, and particularly FIG. 1, night driving glasses 1 according to one embodiment of the present invention include a pair of lenses 2 formed of a single piece of glass, plexiglass, or any other suitable lens material. Each lens 2 has an illuminating portion 3 and a glare-reducing portion 4.

The illuminating portion 3 of each lens is tinted to maximize the transmission of ambient light to improve the wearer's ability to see as much, and as clearly, as possible in the dark. To accomplish this, it is desirable that the lenses have a transmissivity in the range of about 60 to about 80 per cent, with an optimum transmissivity of about 75 per cent.

It also is desirable that the lenses be tinted a color that is most apt to transmit visible light. A colored lens will transmit light of similar wavelength, or color, and will absorb light having a wavelength or color opposite the lens color in the spectrum. Because of its short wavelength, blue light is easily scattered by small particles in the air, such as dust or moisture. Scattered light creates haze, compounding the difficulties of night driving. Therefore, it is desirable for night driving glasses to absorb blue light. Yellow colors, or alternatively amber, are opposite blue in the color spectrum, and thus effectively absorb the scattering blue light to reduce haze. The yellow tint also reduces glare by absorbing scattered moonlight and light from streetlights and headlights reflected from the road surface.

In addition to the ability to absorb blue light, yellow shades have proven to be the most effective at transmitting visible light in general. By maximizing the ambient light that reaches the wearer's eye, objects appear brighter and clearer than they would appear to the naked eye. Of course, too much visible light cannot be absorbed or the wearer may not be able to recognize traffic signals and the like. Yellow lenses traditionally have not been used in sunglasses because they transmit too much light. Rather, yellow lenses have been used in shooting glasses.

The glare-reducing portion 4 of each lens is designed to absorb as much ambient light as possible to reduce the glare from the headlights of oncoming vehicles and other sources. To accomplish this, it is desirable that the lenses have a transmissivity in the range of about 15 per cent to about 50 per cent, with an optimum transmissivity of about 25 per cent. It also is preferable that the lenses be tinted a color that is most apt to absorb the glaring light. Dark shades of gray have proven to be the most effective light-absorbing colors, and absorb blue light similar to yellow colors. Dark green and dark brown also may be effective for the same purpose. Each of those tints absorbs about 75 per cent to about 85 per cent of visible light, as well as nearly 100 per cent of ultraviolet light (both UVA and UVB).

As an alternative to the above-described embodiment, the illuminating portion 3 may be clear for drivers who prefer not to wear tinted lenses while driving at night. In such a case, the glare-reducing portion is still useful to reduce the effects of headlight glare.

Figure 2A:
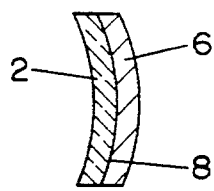
FIG. 2a is a cross-sectional view of a lens of night driving glasses having a nonreflective coating according to an embodiment of the present invention.

FIG. 2a shows a lens 2 of the present invention in cross-section, having nonreflective coating 6 applied to one surface 8 thereof. The nonreflective coating 6 is made from a metallic oxide, preferably magnesium oxide. Metallic fluoride or sulfide substances can be used as well. The nonreflective coating reduces reflection from the surface of the lens and increases the amount of light that passes through the lens.

Figure 2B:
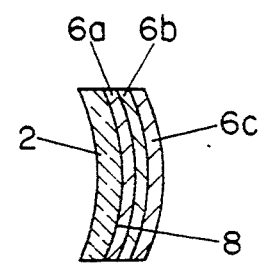

The metallic oxide coating is applied to the front surface of the lens in thin, multiple layers by spraying in a vacuum, as shown at 6a, 6b and 6c in FIG. 2b, the thickness of each layer being controlled by a computer. An uncoated lens transmits approximately 92 per cent of the visible spectrum. The number of layers of nonreflective coating can be varied to selectively increase the amount of glare reduction and additional ambient light transmitted through the lens. For example, a single layer of nonreflective coating reduces glare to provide transmission of about 96 per cent of the ambient light. Application of five to six layers of coating reduce glare to transmit about 99 per cent of the ambient light through the lens.

Therefore, a wearer can vary the darkness of the tint of the lens while maintaining a desired degree of light transmission. For example, if the wearer prefers a dark illuminating color band to reduce glare, then the transmissivity of the color band will decrease, letting in less ambient light. Layers of nonreflective coating can be applied to increase the transmission of ambient light, compensating for the decreased transmission caused by the darker tinted illuminating color band.

If, on the other hand, a wearer prefers a clear, untinted, illuminating portion, one or more layers of the nonreflective coating can be applied to the lens to reduce glare and increase transmission of ambient light to illuminate the wearer's field of vision.

It is expected that the glare-reducing portion will be used as originally contemplated to reflect the strong glare of oncoming vehicles. The benefit of the increased light transmitted through the nonreflective coating as applied to the glare-reducing portion of the lens would be marginal, since the transmissivity of the glare-reducing portion of the lens is so low. It is contemplated, however, that the nonreflective coating be applied to the entire surface of the lens for ease of manufacture, with no adverse consequences when viewing through the glare-reducing portion.

In a preferred embodiment, optimal light transmission under normal night driving conditions, that is, when viewed through the illuminating color band, is about 75 per cent. Depending on the preference of the wearer, the illuminating color band may have a darker tint, for transmissivity of about 70 per cent, for example. Therefore, about two layers of nonreflective coating may be sprayed on the surface of the lens to reduce glare and increase transmissivity to reach the optimal total transmissivity of about 75 per cent. If a wearer prefers an even darker tint, so that the illuminating portion transmits about 68 per cent of the ambient light, for example, then about 5 or 6 layers of nonreflective coating may be sprayed onto the surface of the lens, to reach the optimal 75 per cent transmissivity.

Therefore, according to the present invention, each lens 2 of night driving glasses 1 is unitary in structure and selectively provided with an illuminating portion 3 and a glare-reducing portion 4, with a distinct interface 5 between the lens portions 3 and 4. Each lens is further provided with a coating of nonreflective material 6.

Preferably, the glasses are fitted to the individual wearer so that the top of the wearer's pupil is about 1 mm to about 8 mm below the interface 5, and most preferably, about 5 mm. Alternatively, the glare-reducing portion 4 comprises about 25 per cent to about 50 per cent of the surface area of each lens, with illuminating portion 3 comprising the remainder. In the embodiment of FIG. 1, the glare-reducing portion 4 of each lens comprises only about 25 per cent of the surface area of each lens. In this manner, the interface 5 is above the line of sight.

Figure 3:
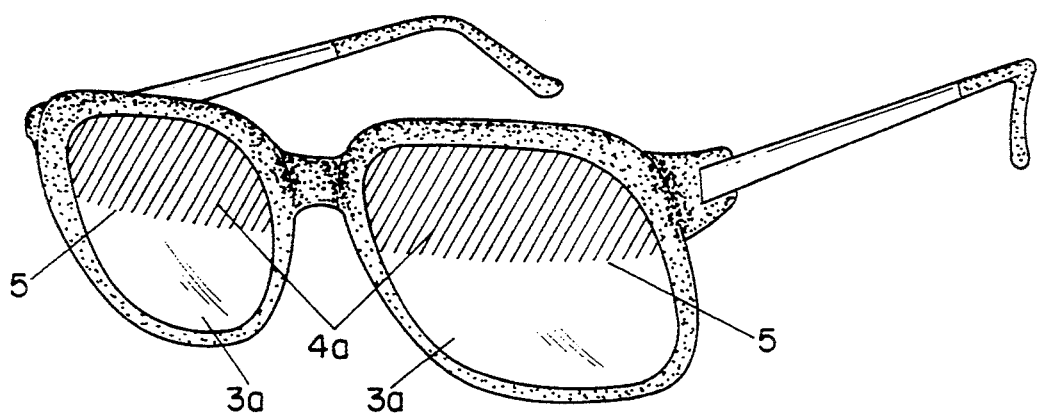
FIG. 3 is a perspective view of night driving glasses according to another embodiment of the present invention.

FIG. 3 shows a modified embodiment of the night driving glasses 1 of the present invention. In the modified embodiment, the illuminating portions 3a and the glare-reducing portions 4a of each lens are shown substantially equal in size.

In summary, the illuminating and glare-reducing lens portions and the nonreflective coating all cooperate to equalize illumination and thereby enhance the wearer's entire field of vision. The wearer's field of vision in general is brightened by the extra ambient light transmitted and the short wavelength blue light absorbed through the illuminating portion 3 of the lens. The glare-reducing portion 4 prevents glaring headlights from overexposing the illuminated field of vision.

The non-reflective coating provides further protection from glaring light, and is selectively applied to compensate for reduced transmissivity resulting from a wearer's selection of darker tinted lenses. Thus, the nonreflective coating 6 helps to maximize the ambient light transmitted through, and glaring light reflected from, the illuminating and glare-reducing portions of the lenses, to provide the most comfortable field of vision under normal driving conditions.

In use, the wearer normally looks through the illuminating portion 3 to generally increase ambient light and improve nighttime vision. When faced with glaring headlights from an oncoming vehicle, the wearer simply tilts his or her head down slightly to look through the glare-reducing portion of the lens 4 to block out the glaring light. When the oncoming vehicle passes, the wearer returns his or her head to its original position to look through the illuminating portion of the lens. By using the glasses of the present invention, a driver can continuously watch the road without impairing vision by the glare of oncoming traffic.

Lenses according to the present invention can easily be adapted for particular uses. For instance, glasses may be made in a clip-on form to removably attach to prescription glasses. Alternatively, the glasses can be made in prescription form. It is also contemplated that the glasses be made in the form of wraparound goggles.

The night driving glasses of the invention may be made by opticians using conventional tinting equipment, and their manufacture does not require any special apparatus. Tinting of plastic lenses may be accomplished by a conventional dying process, as would be known to those having ordinary skill in the art. Application of layers of the nonreflective coating, as discussed above, may be accomplished by computer-controlled spraying in a vacuum, also known to those having ordinary skill in the art.

Any variations or modifications of the present invention envisioned by one of ordinary skill in the art are contemplated to be within the scope of this invention.

I claim:

1. A lens for eyeglasses, comprising an illuminating color band and a glare-reducing color band, the color bands and the lens forming a unitary structure, with a distinct interface between the color bands and a nonreflective coating selectively applied to a surface thereof.

2. A lens for eyeglasses according to claim 1, wherein the illuminating color band extends upwardly from the bottom of the lens to cover about 50 per cent to about 75 per cent of the surface area of the lens.

3. A lens for eyeglasses according to claim 1, wherein the distinct interface is located about 3 mm to about 8 mm above the top of the wearer's pupil.

4. A lens for eyeglasses according to claim 1, wherein the illuminating color band has a transmissivity of about 60 per cent to about 80 per cent.

5. A lens for eyeglasses according to claim 1, wherein the glare-reducing color band has a transmissivity of about 15 per cent to about 50 per cent.

6. A lens for eyeglasses according to claim 1, wherein the nonreflective coating comprises a plurality of layers of metallic oxide.

7. A lens for eyeglasses according to claim 1, wherein the nonreflective coating comprises a plurality of layers of metallic fluoride.

8. A lens for eyeglasses according to claim 1, wherein the nonreflective coating comprises a plurality of layers of metallic sulfide.

9. A lens for eyeglasses according to claim 1, wherein about 1 to about 6 layers of nonreflective coating are applied to the surface of the lens.

10. A lens for eyeglasses according to claim 1, wherein the transmissivity of the illuminating color band in combination with the nonreflective coating is about 90 per cent.

11. A lens for eyeglasses according to claim 1, wherein the illuminating color band is yellow.

12. A lens for eyeglasses according to claim 1, wherein the glare-reducing color band is gray.

13. A pair of eyeglasses especially adapted for night driving use, wherein the lenses are made as defined in claim 1.

14. A lens adapted for use with night driving eyeglasses, comprising an illuminating color band extending upwardly from the bottom of the lens to cover about 50 per cent to about 75 per cent of the surface area of the lens and a glare-reducing color band extending downwardly from the top of the lens to cover the surface area of the lens not covered by the illuminating color band, and the color bands and the lens forming a unitary structure with a distinct interface between the color bands and a nonreflective coating selectively applied to a surface of the lens.

15. A lens for eyeglasses according to claim 14, wherein the nonreflective coating comprises a plurality of layers of metallic oxide.

16. A lens for night driving eyeglasses according to claim 14, wherein the distinct interface is located about 1 mm to about 8 mm above the top of the wearer's pupil.

17. A lens for night driving eyeglasses according to claim 14, wherein the transmissivities of the illuminating color band and the nonreflective coating are variable to obtain a predetermined transmissivity.

18. A lens for night driving eyeglasses according to claim 14, wherein the transmissivity of the illuminating color band in combination with the nonreflective coating is about 70 per cent to about per cent.

19. A lens for night driving eyeglasses according to claim 14, wherein the illuminating color band is yellow, the glare-reducing color band is gray and the nonreflective coating is transparent.

* * * * *